United States Patent [19]

Ker

[11] Patent Number: 5,205,466
[45] Date of Patent: Apr. 27, 1993

[54] MANUFACTURING METHOD OF AUSTENITIC STAINLESS STEEL SELF-TAPPING AND SELF-DRILLING SCREW

[75] Inventor: Yao-Tin Ker, Shiann Shi Shiang, Taiwan

[73] Assignee: Chieh-Chang Tzeng, Jang Huah County, Taiwan

[21] Appl. No.: 913,353

[22] Filed: Jul. 15, 1992

[51] Int. Cl.⁵ .................. B23K 20/24; B23K 101/34; B23K 103/04
[52] U.S. Cl. .................................. 228/125; 228/176; 228/232; 228/263.15; 470/11
[58] Field of Search .................. 470/11, 17; 148/529, 148/534, 211, 213; 228/176, 232, 263.15, 125

[56] References Cited

U.S. PATENT DOCUMENTS

| | | | |
|---|---|---|---|
| 910,434 | 1/1909 | Thompson | 470/17 |
| 3,853,258 | 12/1974 | Louw et al. | 228/125 |
| 3,924,508 | 12/1975 | De Caro | 470/11 |
| 4,279,528 | 7/1981 | Mangiavacchi et al. | 148/213 X |

Primary Examiner—Kenneth J. Ramsey
Attorney, Agent, or Firm—Morton J. Rosenberg; David I. Klein

[57] ABSTRACT

This invention is a manufacturing method of Austenitic stainless steel self-tapping and self-drilling screw. It uses low carbon steel or low carbon alloy steel and forges or cuts it into a round rod with a shoulder, non-threaded bolt, and drilling end portion. After it is carburized and properly heat-treated, it will be welded together with an Austenitic stainless steel round rod which has a non-threaded bolt. And then the welded flush and shoulder will be cut so that a non-carburized hardened area in a proper width can be formed. Lastly it is threaded and quenched so as to manufacture a screw whose head and threaded stem joint are high corrosion-resistance and whose carburized drilling end portion has a high self-tapping and self-drilling function.

4 Claims, 6 Drawing Sheets

MANUFACTURING METHOD OF AUSTENITIC STAINLESS STEEL SELF-TAPPING AND SELF-DRILLING SCREW

BACKGROUND OF THE INVENTION

1. Field of the Invention

This invention relates to a manufacturing method for a screw or threaded member. In particular, this invention pertains to a self-tapping and self-drilling screw which is made of austenitic stainless steel and carburized steel.

2. Prior Art

Due to the rapid development and research of zinc and aluminum coatings of steel sheet, the generally accepted ten year operational life of these kinds of steels has been extended to approximately twenty years. Protective coatings or corrosion resistant layers applied to steel structures and screw retaining elements are also being rapidly developed and studied. Self-tapping and self-drilling screws for fixing coated steel sheet is easily damaged and deformed due to the fact that they are exposed to the external environment. Recently, the constant increased requirements for construction quality has brought a large demand for self-tapping and self-drilling screws made of austenitic stainless steel. However, due to the fact that the metallurgical and mechanical properties of austenitic stainless steel is such that it is easily hardened and poorly shaped when it is formed and is further difficult to meet the requirements of self-drilling by nitriding processes. There are a number of unsolved problems in the conventional manufacturing method for self-tapping and self-drilling screws of austenitic stainless steel which can penetrate 5 mm thickness low carbon steel plate. Some of the problems are as follows:

1. Prior art self-tapping screws of austenitic stainless steel treated by nitriding is shown in FIG. 1 which is a schematic view of a conventional self-tapping stainless steel screw. The portion of the screw designated as N in solid black line in FIG. 1 is the nitride area. The screw is composed of austenitic stainless steel head 1 and a self-tapping thread portion 2. Generally, the surface hardness of the threaded portion can be improved by a nitriding treatment. Although the surface hardness of threaded portions can be improved by nitriding, this conventional screw has the following drawbacks:

(a) the corrosion-resistance of the surface of austenitic stainless steel screws are degraded due to the composition of the nitride; and, (b) nitriding temperature of austenitic steel is about 600° C. lasting for 2-4 hours which causes crystal and grain boundary corrosion problems to the stainless steel and reduces the overall corrosion-resistant function.

2. Prior art self-tapping and drilling screws of austenitic stainless steel may be sectionally hardened but are frangible. In such prior art screws, in order to accomplish self-tapping and self-drilling functions, the screw is formed from different materials into separate portions which include the tapping and drilling portion, and the jointing portion. These two portions are welded together, shaped, threaded and quenched. As shown in FIG. 2, which is a schematic view of a self-tapping and drilling screw which are formed of austenitic stainless steel and high carbon steel, the screw consists of a jointing portion including a stainless steel head 1, threaded bolt 2, and a drilling portion including self-tapping section 3, as well as a drilling end section 4 which are formed of high carbon steel. The manufacturing method is to weld the material of the jointing and drilling portions at the area W and then cut and thread the drill and tap portion. Subsequently, they are quenched to increase the fully sectional hardness of the self-tapping section 3 and the drilling end section 4. Although the screw is made of high carbon steel and is quenched to improve the fully sectional hardness for the self-tapping section 3 and drilling end section 4, such still has the following drawbacks:

(a) High carbon steel is not conducive to forging. Such is suited to shaping the drilling end portion through a machine cut which raises the manufacturing costs. On the other hand, the hardness of heat-effected zones influenced by welding in the high carbon steel side is over HV500 degrees, so it tends to induce cracking and become difficult to thread and further shortens the life of threading dies; and, (b) After the self-tapping and drilling end sections of high carbon steel are quenched, they are fully sectionally hardened. This makes the fully sectional hardness of tapping and drilling end sections reach as high as HV550–HV600 degrees so that both sections become brittle and frangible.

3. Prior art self-tapping and drilling screws of austenitic stainless steel are contaminated by carbon. In order to overcome the drawbacks of high hardness of a heat effected zone after being influenced by welding and the drawback of being easily cracked or frangible, the manufacturing method is to use a low carbon steel for the material of the self-tapping and drilling section which is welded to the jointing portion of the stainless steel and then carburized and quenched together. As is shown in FIG. 3, another schematic of the self-tapping and drilling screw which is made of austenitic stainless steel wherein the black line C in FIG. 3 is the carburized area, the screw consists of a jointing portion including a stainless steel head 1, threaded bolt 2, and a drilling portion including self-tapping section 3 as well as a drilling end section 4 which are formed of low carbon steel. The manufacturing method is to weld materials of the stainless steel and low carbon steel portions at the area W and then thread and form the end portion. Subsequently, they are carburized and quenched to improve the surface hardness for the self-tapping section 3 and drilling end section 4. Although this method can solve the welding problems of high carbon steel joints, the austenitic stainless steel head and threaded bolt are contaminated by carbon due to the carburization step. Such has the drawbacks of diminishing the original corrosion-resistant function. Today, emphasis is placed on development of corrosion-resistance and work quality, thus this method of manufacture is less used than the above-described high carbon steel self-tapping and drilling screws.

SUMMARY OF THE INVENTION

The object of the invention is to provide a round rod using a low carbon steel forged or cut in advance to have a shoulder section, non-threaded bolt section, and a drilling end section. After the rod is carburized and properly heat treated, it is welded with the non-threaded bolt section formed of austenitic stainless steel and then the weld flash and shoulder is removed. The round rod is threaded and shaped and then quenched so as to form a corrosion-resistant screw having a jointing portion of austenitic stainless steel and self-tapping and drilling end sections of carburized steel. The screw manufacture from the subject method lowers the cost of materials and overcomes the drawbacks of conventional screws such as the hardness of welding heat-effected zones of high carbon steel joints may be high enough to induce cleavage and cracking making the fully sectional hardness of the threaded and drilling end section become high enough to make them brittle and easy to break. Austenitic stainless steel heads and bolts may be contaminated by carbon and nitrogen and may diminish the original function of corrosion-resistance. Additionally, the invention concept provides for a shoulder which allows for accepting increased axial pressure, increased axial electric current passage, and automatic feeding.

DESCRIPTION OF THE PREFERRED EMBODIMENTS

Figure 1:
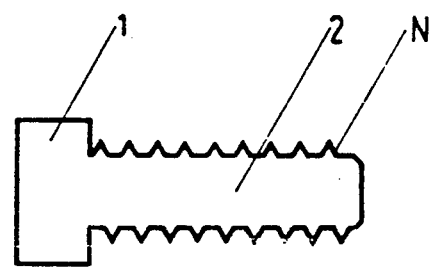
FIG. 1 is a schematic view of a conventional nitriding self-tapping austenitic stainless steel screw.
Figure 2:
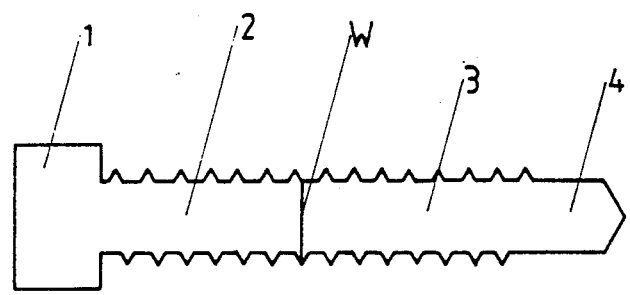
FIG. 2 is a schematic view of a self-tapping and drilling screw which is formed of fully sectionally hardened high carbon steel and austenitic stainless steel.
Figure 3:
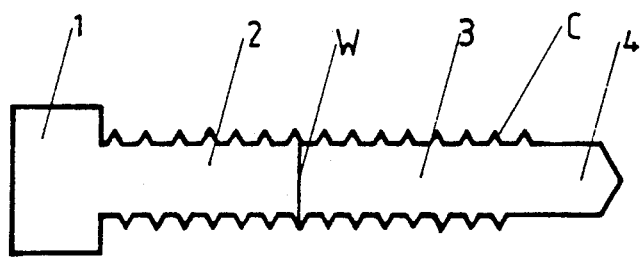
FIG. 3 is a schematic view of a self-tapping and drilling screw which are formed of carbon-contaminated austenitic stainless steel and carburized steel.
Figure 4:
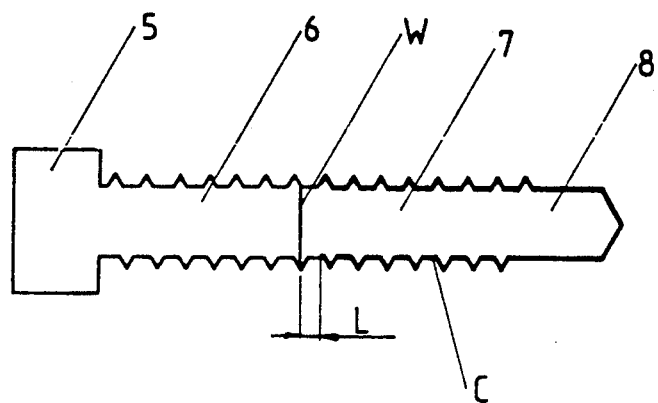
FIG. 4 is a schematic view of a self-tapping and drilling screw manufactured of austenitic stainless steel formed by the method of this invention.

As illustrated in FIG. 4, there is shown a schematic view of a self-tapping and drilling screw manufactured of austenitic stainless steel by the method of this invention. The heavy or coarse black line C in FIG. 4 is the carburized area. The screw consists of austenitic stainless steel head 5 and threaded bolt 6, as well as a drilling portion including self-tapping section 7 and a drilling end section 8 which are formed of carburized steel materials.

Figure 5:
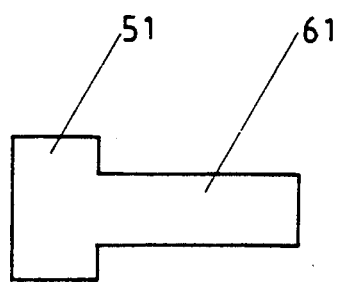
FIG. 5 is a schematic view of an austenitic stainless steel round rod formed in advance in accordance with this invention.
Figure 6:
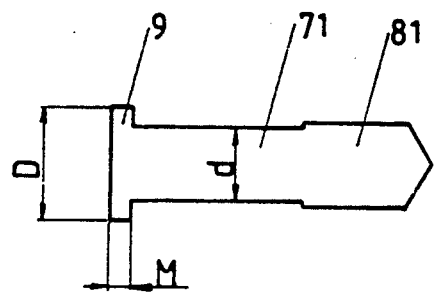
FIG. 6 is a schematic view of a low carbon steel round rod shaped in advance prior to carburization.
Figure 7:
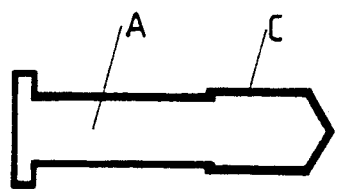
FIG. 7 is a schematic view of a carburized and quenched, as well as tempered, low carbon steel round rod.
Figure 8:
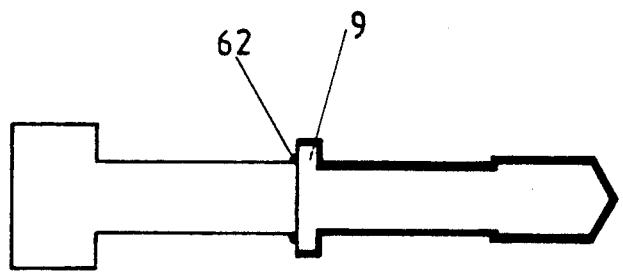
FIG. 8 is a schematic view of a partially finished product welded together prior to cutting.
Figure 9:
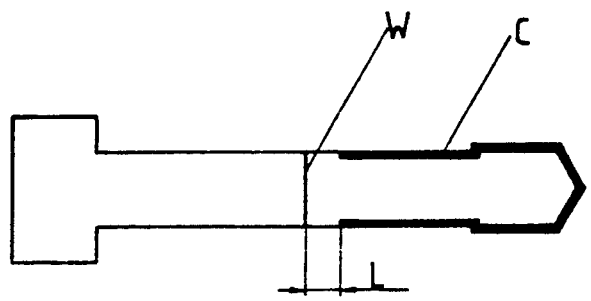
FIG. 9 is a schematic view of a partially completed product whose weld flash and shoulder has been removed.

Detailed steps of a manufacturing flow chart relating to this method invention are described in the following paragraphs. As shown in FIG. 5, austenitic stainless steel round rod is composed of a pre-formed head 51 and a non-threaded bolt 61. As shown in FIG. 6, a pre-formed shoulder 9 formed from low carbon steel is provided. The outer diameter D of the shoulder is approximately equal to or larger than the outer diameter d of the non-threaded bolt 71 plus twice the carburized depth. The width M of the shoulder is approximately equal to or larger than the width of a welding heat-effected zone plus twice the carburized depth. A round rod is provided including a non-threaded bolt 71 and a shaped drilling end portion 81. Carburization of the low carbon steel is shown in FIG. 7 with the hardness of core A adjusted to approximately HV180 degrees, and the hardness of carburized surface which is shown as coarse black line C in FIG. 7 is adjusted to about HV200 degrees. The round rod side 61 is welded, as is shown in FIG. 5, to the side of the shoulder of the partially completed product as shown in FIG. 7. The combined portions are sectionally configured as shown in FIG. 8. The weld flash 62 and the shoulder 9 is cut or removed as shown in FIG. 8. They are then formed into a sectional configuration as shown in FIG. 9 providing a non-carburized hardened area having an L width near the welded interface W. The hardness of this area is influenced by the welding and the hardness is raised slightly but it is still lower than HV240 degrees which is suitable for further processing. Finally, after threading and quenching, the finished product is produced as is shown in FIG. 4.

Figure 10:
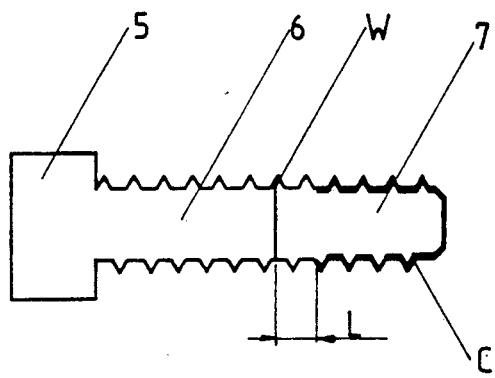
FIG. 10 is a schematic view of a self-tapping screw manufactured of austenitic stainless steel by the method of this invention.

In a similar manner, the manufacturing method and design principle of this invention may also be used for the manufacturing of austenitic stainless steel self-tapping screws. The sectional view of this type of final product is shown in FIG. 10. The screw is composed of an austenitic stainless steel head 5 and threaded bolt 6. The screw also includes a self-tapping section formed of carburized steel 7. The manufacturing steps with the exception of the unshaped drilling end portion is substantially the same as that of the above-described self-tapping and drilling screw.

The low carbon steel is carburized to a depth of about 0.3 mm. The outer diameter D of the shoulder is approximately equal to or larger than the outer diameter d of the non-threaded bolt 71 plus twice the carburized depth. The width M of the shoulder is approximately equal to or larger than the width of welding heat-effected zone dimensions plus twice the carburized depth dimension. For example, if the width of welding heat-effected zone is 2 mm, width M of the shoulder should be about 2.6 mm. This is due to the fact that after the side of the shoulder is welded, a carburized portion about 0.3 mm wide layer is squeezed out which becomes the weld flash. After being cut, the width of the shoulder minus two sides of the carburized depth (each side being about 0.3 mm) of the shoulder, a 2 mm width non-carburized hardened area near the welding interface W will be formed. The non-carburized area solves the problem that after the welding of carburized steel or high carbon steel rods, the hardness of the heat-effected zone is too high and tends to crack. Moreover, different welding processes and parameters may cause different heat-effected zones. Thus, the design of the shoulder width and non-carburized area may be varied to meet different needs. Additionally, this invention has a shoulder which allows for bearing additional axial pressure, increased axial electric current passage, and for automatic feeding. This invention may also use low carbon alloy steel instead of low carbon steel and shape the shoulder into a round, multi-angular, or other geometrical configuration to reach the same technological objective and function.

Figure 11:
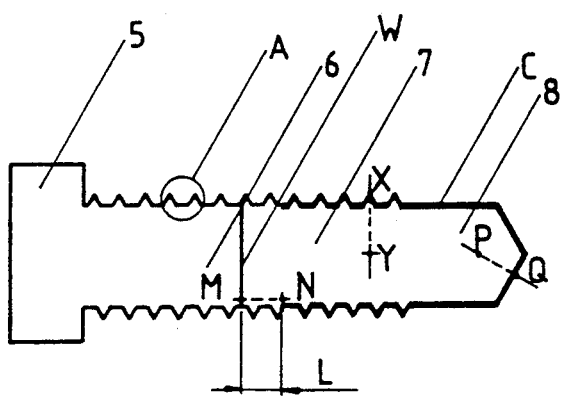
FIG. 11 is a schematic view of a self-tapping and drilling screw manufactured of austenitic stainless steel formed by the method of this invention.

As shown in FIG. 11, there is provided a schematic view of the quality of a taken sample of a self-tapping and drilling screw manufactured of austenitic steel by the method of this invention. This includes the austenitic stainless steel head 5 and threaded bolt 6, and a drilling portion including a self-tapping section 7 and a drilling end section 8 which are formed of carburized steel, all shown after the screw is quenched and is prepared for testing of various metallurgical and mechanical properties.

Figure 12:
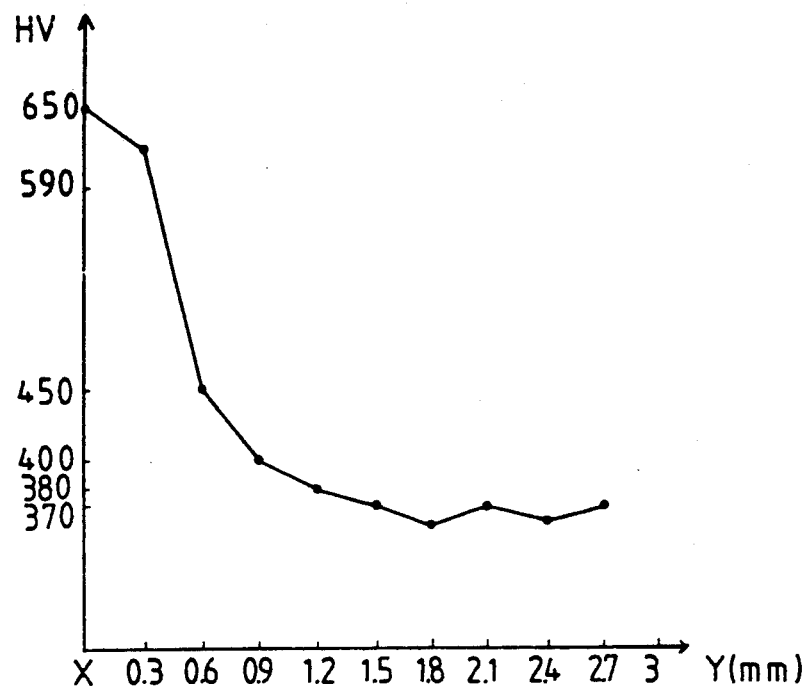
FIG. 12 is a graphical view of dispersed hardness from X to Y points as shown in FIG. 11 having an applied load of 100 g.

As shown in graphical FIG. 12, there is provided a view of dispersed hardness from points X to Y, as shown in FIG. 11 with an applied load of 100 g. The result found is that the hardness of the core is HV370 degrees, surface hardness if HV650 degrees, effective carburized depth is 0.32 mm. This confirms that the core has enough toughness and its surface has enough hardness to meet the requirements for self-tapping threads.

Figure 13:
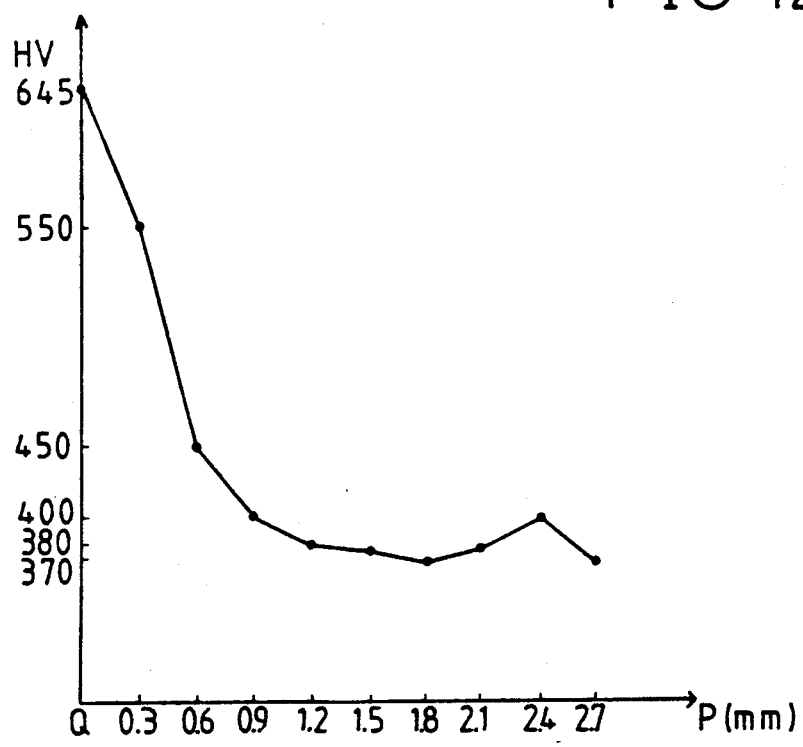
FIG. 13 is a graphical view of dispersed hardness from points Q to P as shown in FIG. 11 having an applied load of 100 g; and, FIG. 14 is a graphical view of dispersed hardness of non-carburized hardened areas from points M to N as shown in FIG. 11 having an applied load of 100 g.

As shown in FIG. 13, a view of dispersed hardness from points Q to P of drilling end portion 8 as provided in FIG. 11 having an applied load of 100 g. This experimental base confirms that the hardness of the core s HV370 degrees, surface hardness is HV645 degrees, and the effective carburized depth is 0.28 mm. Once again, this confirms that the core has enough toughness and its surface has enough hardness so that it meets the requirements for drilling end portions of a self-drilling screw.

Figure 14:
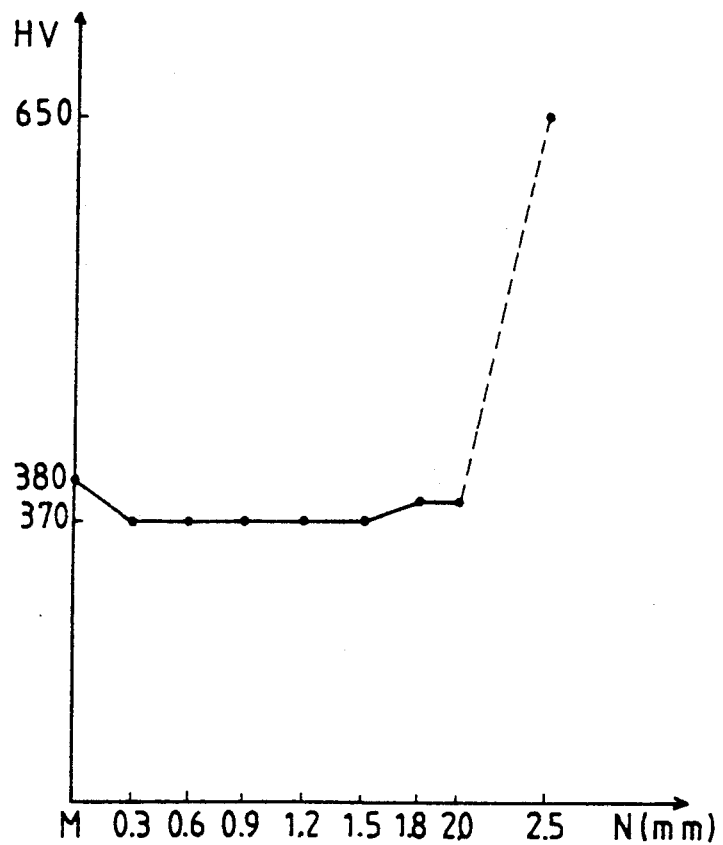

As shown in FIG. 14, there is provided a view of dispersed hardness of non-carburized hardened areas from points M to N as shown in FIG. 11 having an applied load of 100 g. The resulting graph shows that the highest hardness is HV370 degrees so a non-carburized hardened area of 2 mm width near the welded interface W is formed which reinforces the toughness of the welding joint.

Observation of the microstructure for the part A shown in FIG. 11 finds no carbon contamination resulting in a better corrosion-resistant function.

In accordance with the above description, the present invention has the following features:

1. Because the low carbon or low carbon alloy steel self-tapping and drilling end portion are carburized before they are welded, austenitic stainless steel heads and bolts are not contaminated by the carbon and nitrogen which overcomes the drawback of diminishing original corrosion-resistant properties;

2. Because its carburized shoulder is cut after the screw is welded, a proper non-carburized hardened area is formed and hardness only reaches a low approximating HV240 degrees which will not include cleavage and cracking so that there is a result of easier threading;

3. Because the low carbon or low carbon alloy steel self-tapping and drilling end portion is only carburized such will not increase brittleness and frangibility so that the resulting screws can be used safely and practically; and, 4. Because the partially finished product has a shoulder, such is good for bearing increased axial pressures, for axial electric current passage, and for automatic feeding when it is welded.

I claim:

1. A method of manufacturing an austenitic stainless steel self-tapping and self-drilling screw formed from low carbon or low carbon alloy steel including the steps of:
    (a) forming a low carbon or low carbon alloy steel rod having a rod shoulder section, a rod non-threaded bolt section and a rod drilling end section;
    (b) carburizing and heat treating said rod to a predetermined carburization depth to provide a carburized portion of said rod;
    (c) establishing an austenitic stainless steel rod having a head section and a non-threaded bolt section;
    (d) welding said austenitic stainless steel non-threaded bolt section to said rod shoulder section in aligned relation thereto forming a weld flash;
    (e) removing said rod shoulder section and said weld flash to provide a non-carburized section of said rod;
    (f) threading said rod non-threaded bolt section and said austenitic stainless steel rod non-threaded bolt section.

2. The method of manufacturing said austenitic stainless steel self-tapping and self-drilling screw as recited in claim 1 wherein the step of forming said low carbon or low carbon alloy steel rod includes the step of:
    establishing said rod shoulder section having a diameter approximately equal to or larger than the summation of an outer diameter of said rod non-threaded bolt section and twice said carburization depth, said rod shoulder section having a width approximately equal to or larger than the summation of a width of a welding heat affected zone and twice said carburization depth.

3. The method of manufacturing said austenitic stainless steel self-tapping and self-drilling screw as recited in claim 1 wherein said rod non-carburized portion has a width approximately equal to or larger than a width of a welding heat affected zone.

4. The method of manufacturing said austenitic stainless steel self-tapping and self-drilling screw as recited in claim 1 wherein said rod shoulder section is contoured into a predetermined cross-sectional geometric configuration.

* * * * *